United States Patent
Tran et al.

(10) Patent No.: US 9,858,484 B2
(45) Date of Patent: Jan. 2, 2018

(54) SYSTEMS AND METHODS FOR DETERMINING VIDEO FEATURE DESCRIPTORS BASED ON CONVOLUTIONAL NEURAL NETWORKS

(71) Applicant: Facebook, Inc., Menlo Park, CA (US)

(72) Inventors: Du Le Hong Tran, Hanover, NH (US); Balamanohar Paluri, Menlo Park, CA (US); Lubomir Bourdev, Mountain View, CA (US); Robert D. Fergus, New York, NY (US); Sumit Chopra, Jersey City, NJ (US)

(73) Assignee: Facebook, Inc., Menlo Park, CA (US)

( * ) Notice: Subject to any disclaimer, the term of this patent is extended or adjusted under 35 U.S.C. 154(b) by 92 days.

(21) Appl. No.: 14/585,826

(22) Filed: Dec. 30, 2014

(65) Prior Publication Data

US 2016/0189009 A1    Jun. 30, 2016

(51) Int. Cl.
  *G06K 9/62*  (2006.01)
  *G06K 9/00*  (2006.01)

(52) U.S. Cl.
  CPC ................. *G06K 9/00744* (2013.01)

(58) Field of Classification Search
  CPC ......... G06K 9/66; G06K 9/00744; G06K 9/52
  See application file for complete search history.

(56) References Cited

U.S. PATENT DOCUMENTS

| | | | | |
|---|---|---|---|---|
| 5,355,528 A * | 10/1994 | Roska | ............. | G06N 3/0635 706/29 |
| 6,549,879 B1 * | 4/2003 | Cullick | ............. | E21B 49/00 702/11 |
| 7,102,652 B2 * | 9/2006 | O'Donnell | ............. | G06T 15/503 345/629 |
| 8,818,923 B1 * | 8/2014 | Hoffmann | ......... | G06F 17/30985 706/18 |
| 9,171,247 B1 * | 10/2015 | Hoffmann | ................ | G06K 9/62 |
| 9,230,192 B2 * | 1/2016 | Jin | ......... | G06K 9/6267 |
| 9,330,171 B1 * | 5/2016 | Shetty | ............... | G06F 17/30784 |
| 2005/0131660 A1 * | 6/2005 | Yadegar | .................. | G06T 9/001 703/2 |
| 2009/0070550 A1 * | 3/2009 | Solomon | ............... | G06F 15/803 712/15 |
| 2011/0116711 A1 * | 5/2011 | Wang | .................... | G06K 9/4671 382/165 |

OTHER PUBLICATIONS

Shuiwang Ji et al., "3D Convolutional Neural Networks for Human Action Recognition", IEEE Computer Society, pp. 221-231, Feb. 28, 2012.*

* cited by examiner

*Primary Examiner* — Samir Ahmed
(74) *Attorney, Agent, or Firm* — Sheppard Mullin Richter & Hampton LLP

(57) ABSTRACT

Systems, methods, and non-transitory computer-readable media can acquire video content for which video feature descriptors are to be determined. The video content can be processed based at least in part on a convolutional neural network including a set of two-dimensional convolutional layers and a set of three-dimensional convolutional layers. One or more outputs can be generated from the convolutional neural network. A plurality of video feature descriptors for the video content can be determined based at least in part on the one or more outputs from the convolutional neural network.

19 Claims, 8 Drawing Sheets

SYSTEMS AND METHODS FOR DETERMINING VIDEO FEATURE DESCRIPTORS BASED ON CONVOLUTIONAL NEURAL NETWORKS

FIELD OF THE INVENTION

The present technology relates to the field of media processing. More particularly, the present technology relates to techniques for determining video feature descriptors based on convolutional neural networks.

BACKGROUND

Today, people often utilize computing devices or systems for a wide variety of purposes. For example, users can use their computing devices (or systems) to interact with one another, create content, share information, and access information. In some instances, a user of a computing device can utilize a camera or other image sensor of the computing device to capture or record media content, such as video content. Sometimes users have to manually provide information, such as by manually inputting descriptions and tags (e.g., identifier tags, location tags, hashtags, etc.), in order to describe the video content.

In some instances, media content can be analyzed by computing devices or systems in attempt to identify items, subjects, or other objects that are represented or included in the media content. In one example, images can be analyzed to detect one or more faces in each of the images. In another example, an image can be analyzed to identify any products within the image that are available for purchase via an online storefront. However, conventional approaches for recognizing objects within media content can often times be inefficient, inaccurate, and limited in capability. Due to these and other reasons, conventional approaches can create challenges for or reduce the overall user experience associated with media content interaction.

SUMMARY

Various embodiments of the present disclosure can include systems, methods, and non-transitory computer readable media configured to acquire video content for which video feature descriptors are to be determined. The video content can be processed based at least in part on a convolutional neural network including a set of two-dimensional convolutional layers and a set of three-dimensional convolutional layers. One or more outputs can be generated from the convolutional neural network. A plurality of video feature descriptors for the video content can be determined based at least in part on the one or more outputs from the convolutional neural network.

In an embodiment, the video content can be represented as a plurality of two-dimensional image frames. Each of the plurality of two-dimensional image frames can extend in a first spatial dimension and a second spatial dimension. The plurality of two-dimensional image frames can be temporally sorted. A third dimension can correspond to a time dimension with respect to which the plurality of two-dimensional image frames is temporally sorted.

In an embodiment, the processing of the video content based at least in part on the convolutional neural network can further comprise inputting a representation of the video content into the set of two-dimensional convolutional layers. At least one two-dimensional convolutional operation can be applied, within the set of two-dimensional convolutional layers, to the representation of the video content. A first collection of signals can be outputted from the set of two-dimensional convolutional layers. At least a portion of the first collection of signals can be inputted into the set of three-dimensional convolutional layers. At least one three-dimensional convolutional operation can be applied, within the set of three-dimensional convolutional layers, to at least the portion of the first collection of signals. A second collection of signals can be outputted from the set of three-dimensional convolutional layers. The one or more outputs from the convolutional neural network can be dependent on at least a portion of the second collection of signals.

In an embodiment, the convolutional neural network can include a set of fully-connected layers. At least the portion of the second collection of signals can be inputted into the set of fully-connected layers. The set of fully-connected layers can output a third collection of signals. The one or more outputs from the convolutional neural network can be generated based at least in part on at least a portion of the third collection of signals.

In an embodiment, the at least one two-dimensional convolutional operation can utilize at least one two-dimensional filter to convolve the representation of the video content. The representation of the video content can be reduced in signal size based at least in part on the at least one two-dimensional convolutional operation.

In an embodiment, the at least one three-dimensional convolutional operation can utilize at least one three-dimensional filter to convolve at least the portion of the first collection of signals.

In an embodiment, the set of two-dimensional convolutional layers can include at least five two-dimensional convolutional layers. The set of three-dimensional convolutional layers can include at least three three-dimensional convolutional layers.

In an embodiment, the convolutional neural network can be trained based at least in part on the video content. The video content can be associated with one or more labels for at least one of a recognized scene, a recognized object, or a recognized action.

In an embodiment, the training of the convolutional neural network can further comprise determining one or more differences between the one or more labels and the plurality of video feature descriptors. One or more weight values of one or more filters associated with the convolutional neural network can be adjusted to minimize the one or more differences. The adjusting of the one or more weight values can occur during a backpropagation through the convolutional neural network.

In an embodiment, the video feature descriptors can provide a first set of metrics indicating likelihoods that specified scenes are represented in the video content, a second set of metrics indicating likelihoods that specified objects are represented in the video content, and a third set of metrics indicating likelihoods that specified actions are represented in the video content.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
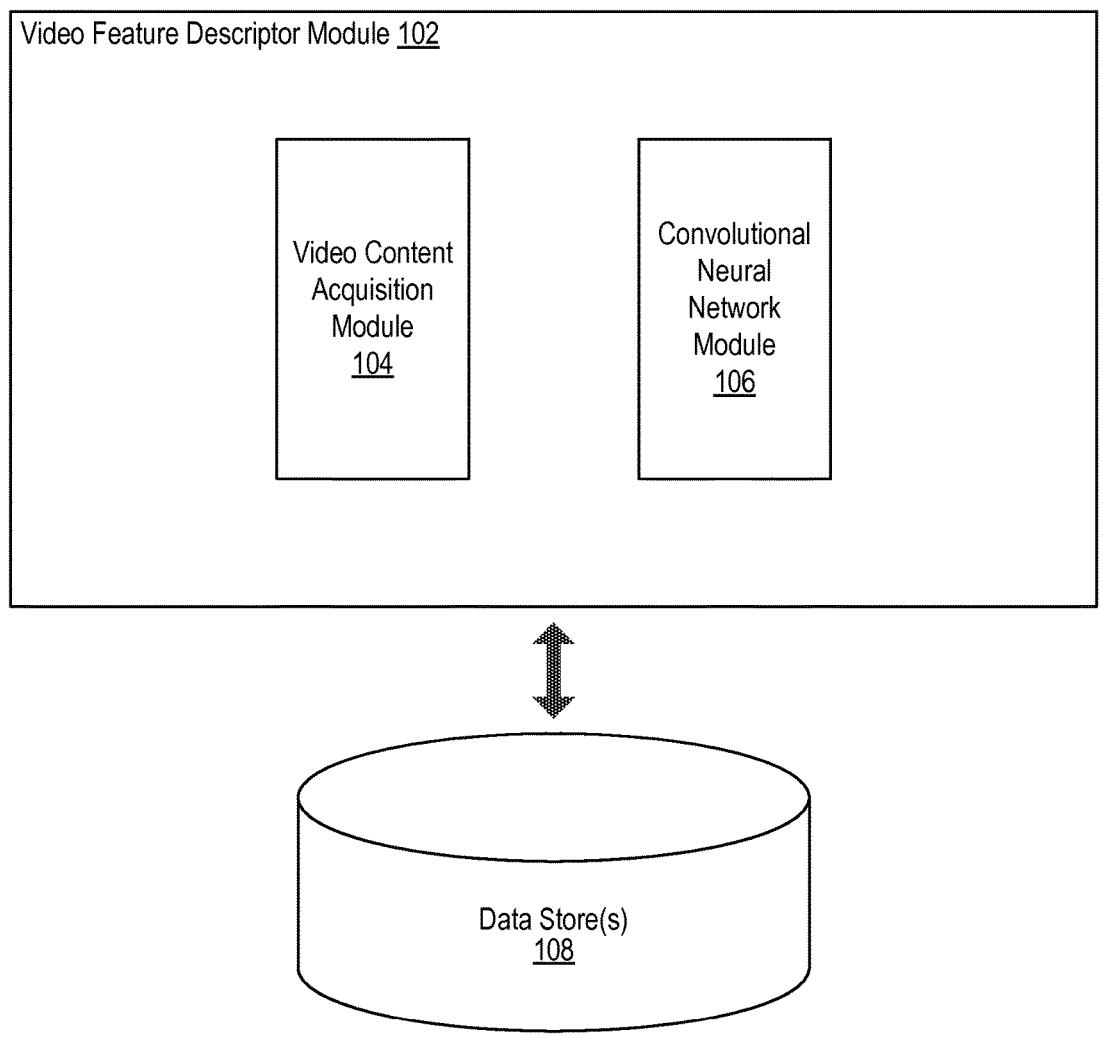
FIG. 1 illustrates an example system including an example video feature descriptor module configured to facilitate determining video feature descriptors based on convolutional neural networks, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Determining Video Feature Descriptors Based on Convolutional Neural Networks

People use computing devices or systems for a wide variety of purposes. Computing devices can provide different kinds of functionality. Users can utilize their computing devices to produce information, access information, and share information. In some cases, computing devices can include or correspond to cameras capable of capturing or recording media content, such as videos. Videos can generally include a set of images, such as a set of video image frames or still frames. Not only can videos represent or include scenes, items, subjects, or other objects, but videos can also represent or include various movements, actions, or other changes in appearance over time.

Conventional approaches to recognizing objects in media content generally involve analyzing image content in attempt to recognize or identify any items, subjects, or other objects within the image content. In one example, conventional approaches to image object recognition can utilize two-dimensional convolutional neural networks. However, conventional two-dimensional convolutional neural networks can be limited in capability in that video content cannot be adequately or practically analyzed in accordance with such conventional approaches. It follows that movements, motion, or other actions represented or included in video content cannot be properly recognized under conventional approaches. Moreover, in some cases, conventional approaches can require significant resources, such as time and processing power. As such, these and other similar conventional approaches can be limiting, inaccurate, and inefficient.

Therefore, an improved approach can be beneficial for addressing or alleviating various concerns associated with conventional approaches. The disclosed technology can enable video feature descriptors to be acquired, calculated, identified, or otherwise determined based on convolutional neural networks, which can also refer to deep convolutional neural networks, deep networks, etc. Various embodiments of the present disclosure can acquire video content for which video feature descriptors are to be determined. The video content can be processed based at least in part on a convolutional neural network including a set of two-dimensional convolutional layers and a set of three-dimensional convolutional layers. One or more outputs can be generated from the convolutional neural network. A plurality of video feature descriptors for the video content can be determined based at least in part on the one or more outputs from the convolutional neural network. It is contemplated that there can be many variations and/or other possibilities.

FIG. 1 illustrates an example system 100 including an example video feature descriptor module 102 configured to facilitate determining video feature descriptors based on convolutional neural networks, according to an embodiment of the present disclosure, according to an embodiment of the present disclosure. As shown in the example of FIG. 1, the example video feature descriptor 102 can include a video content acquisition module 104 and a convolutional neural network module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the video feature descriptor module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video feature descriptor module 102 can be implemented, in part or in whole, as software running on one or more computing devices or systems, such as on a user or client computing device. In one example, the video feature descriptor module 102 or at least a portion thereof can be implemented as or within an application (e.g., app), a program, or an applet, etc., running on a user computing device or a client computing system, such as the user device 710 of FIG. 7. In another example, the video feature descriptor module 102 or at least a portion thereof can be implemented using one or more computing devices or systems that include one or more servers, such as network servers or cloud servers. In some instances, the video feature descriptor module 102 can, in part or in whole, be implemented within or configured to operate in conjunction with a social networking system (or service), such as the social networking system 730 of FIG. 7.

The video content acquisition module 104 can be configured to facilitate acquiring video content for which video feature descriptors are to be determined. In some instances, the video content acquisition module 104 can acquire video content from the social networking system. In some cases, the video content acquisition module 104 can acquire video content from an online media content system (or service). In one example, a user of the social networking system and/or the online media content system can upload, share, or otherwise provide a video. The video content acquisition module 104 can acquire the user's video, and the video feature descriptor module 102 can facilitate determining video feature descriptors for the user's video.

In some embodiments, video content can be stored at the at least one data store 108. In some instances, the video feature descriptor module 102 can be configured to communicate and/or operate with the at least one data store 108, as shown in the example system 100. The at least one data store 108 can be configured to store and maintain various types of data. In some implementations, the at least one data store 108 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. In some embodiments, the at least one data store 108 can store media content including video content, which can be acquired by the video content acquisition module 104. In some cases, the at least one data store 108 can also store information associated with the video content, such as labels, tags, attributes, properties, and/or descriptions for the video content. It should be appreciated that many variations are possible.

The convolutional neural network module 106 can be configured to facilitate processing the video content acquired by the video content acquisition module 104. In some embodiments, the convolutional neural network module 106 can process the video content based at least in part on a convolutional neural network including a set of two-dimensional convolutional layers and a set of three-dimensional convolutional layers. The convolutional neural network module 106 can also be configured to facilitate generating one or more outputs from the convolutional neural network. The convolutional neural network module 106 can also be configured to facilitate determining, based at least in part on the one or more outputs from the convolutional neural network, a plurality of video feature descriptors for the video content. More details regarding the convolutional neural network module 106 will be provided below with reference to FIG. 2.

In one example, a video (e.g., a video file, a video clip, a video portion, etc.) can be acquired by the video content acquisition module 104. In this example, the video can include a cat jumping over a parked bicycle in the woods. The convolutional neural network module 106 can develop a convolutional neural network including a set of (one or more) two-dimensional convolutional layers and a set of (one or more) three-dimensional convolutional layers. The video can be processed based at least in part on the convolutional neural network and outputs can be generated or produced from the convolutional neural network. A plurality of video feature descriptors for the video can be identified, defined, or otherwise determined based at least in part on the outputs. The video feature descriptors can provide probabilities that certain scenes, objects, and/or actions (each of which can sometimes be referred to as a "concept") are recognized or identified in the video.

Continuing with the previous example, the video feature descriptors for the video can indicate a 84% probability that is video is associated with an outdoor scene, a 77% probability that the video is associated with a forest scene, a 26% probability that the video is associated with an indoor scene, a 23% probability that the video is associated with a living room scene, and so forth. Moreover, in this example, the video feature descriptors for the video can indicate a 96% probability that a cat object is in the video, a 24% probability that a dog object is in the video, a 79% probability that a tree object is in the video, a 88% probability that a bicycle object is in the video, a 12% probability that a person object is in the video, and so forth. In this example, the video feature descriptors can also indicate a 81% probability of a jumping action being in the video, a 33% probability of a jogging action, a 55% probably of a walking action, and so forth. In some instances, the video feature descriptors (e.g., probabilities) of the video can be utilized in further processing of the video, such as when categorizing, sorting, labeling, and/or tagging the video. It should be understood that this example and the specific details in the example are provided for illustrative purposes and that there can be many variations and other possibilities. For example, in some cases, there can be hundreds or thousands of video feature descriptors for various scenes, objects, actions, or other concepts.

Figure 2:
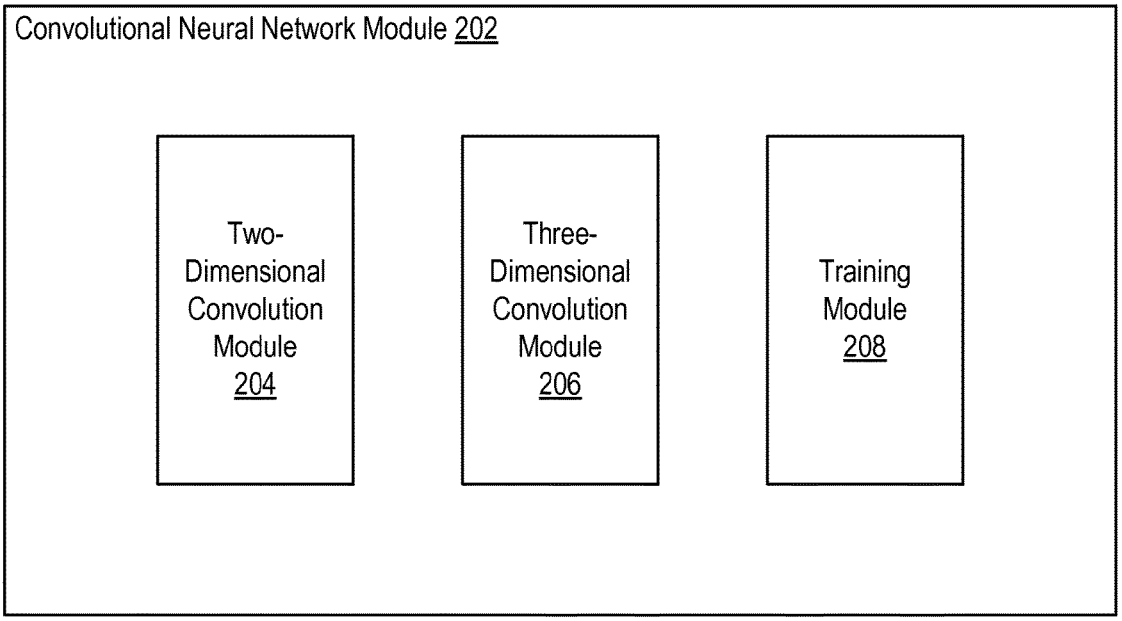
FIG. 2 illustrates an example convolutional neural network module configured to facilitate determining video feature descriptors based on convolutional neural networks, according to an embodiment of the present disclosure.

FIG. 2 illustrates an example convolutional neural network module 202 configured to facilitate determining video feature descriptors based on convolutional neural networks, according to an embodiment of the present disclosure. In some embodiments, the convolutional neural network module 106 of FIG. 1 can be implemented as the example convolutional neural network module 202. As shown in FIG. 2, the example convolutional neural network module 202 can include a two-dimensional convolution module 204, a three-dimensional convolution module 206, and a training module 208.

As discussed previously, in some embodiments, the convolutional neural network module 202 can develop (e.g., construct, maintain, train, etc.) a convolutional neural network including a set of one or more two-dimensional convolutional layers and a set of one or more three-dimensional convolutional layers. The convolutional neural network module 202 can utilize the two-dimensional convolution module 204 to construct, develop, and/or maintain the set of two-dimensional convolutional layers and can utilize the three-dimensional convolution module 206 to construct, develop, and/or maintain the set of three-dimensional convolutional layers.

As discussed, the convolutional neural network module 202 can facilitate processing video content based (at least in part) on the convolutional neural network. For example, the video content can be forward propagated through the convolutional neural network in an inference process to generate one or more outputs from the convolutional neural network. The convolutional neural network module 202 can further determine, identify, or define a plurality of video feature descriptors for the video content based on the outputs. In some instances, the video feature descriptors can provide a respective probability percentage, for each concept in a list of predefined or preset concepts (e.g., scenes, objects, actions, etc.), corresponding to a respective confidence indicating whether each concept is likely recognized in the video content or not. The video feature descriptors can, for example, provide a first set of metrics indicating likelihoods that specified scenes are represented in the video content, a second set of metrics indicating likelihoods that specified objects are represented in the video content, and a third set of metrics indicating likelihoods that specified actions are represented in the video content. A more detailed discussion regarding the processing of the video content based at least in part on the convolutional neural network will be provided below with reference to FIG. 3.

Furthermore, the training module 208 of the convolutional neural network module 202 can be configured to facilitate training the convolutional neural network. In some cases, training video content can be received or otherwise acquired. As such, the training module 208 can train the convolutional neural network based at least in part on the training video content. The training video content can be known, verified, or confirmed to include, represent, or capture certain scenes, objects, and/or actions. For example, the training video content can be associated with one or more labels (e.g., social tags, descriptive tags, hashtags, etc.) for at least one of a recognized scene, a recognized object, or a recognized action. Based (at least in part) on the training video content being processed through the convolutional neural network, a plurality of video feature descriptors can be determined for the training video content. The determined plurality of video feature descriptors can be compared to the one or more labels that are known or confirmed for the training video content. The training of the convolutional neural network can cause the determined video feature descriptor to be closer to the known labels or expected results (i.e., ground truth). It is contemplated that many iterations of the training can be performed with various training video content items.

In some instances, the training module 208 can be configured to determine one or more differences between the one or more labels and the determined plurality of video feature descriptors. The training module 208 can perform a backpropagation through the convolutional neural network. During the backpropagation, the training module 208 can adjust one or more weight values of one or more filters associated with the convolutional neural network in order to minimize the one or more differences. Accordingly, over a number of training iterations, optimal or otherwise suitable weight values can be learned for the filters and the convolutional neural network can be sufficiently trained. In some instances, each weight value for a filter can correspond to a pixel value (e.g., RGB value, HEX code, etc.) of the filter. It should be appreciated that many variations are possible.

Figure 3:
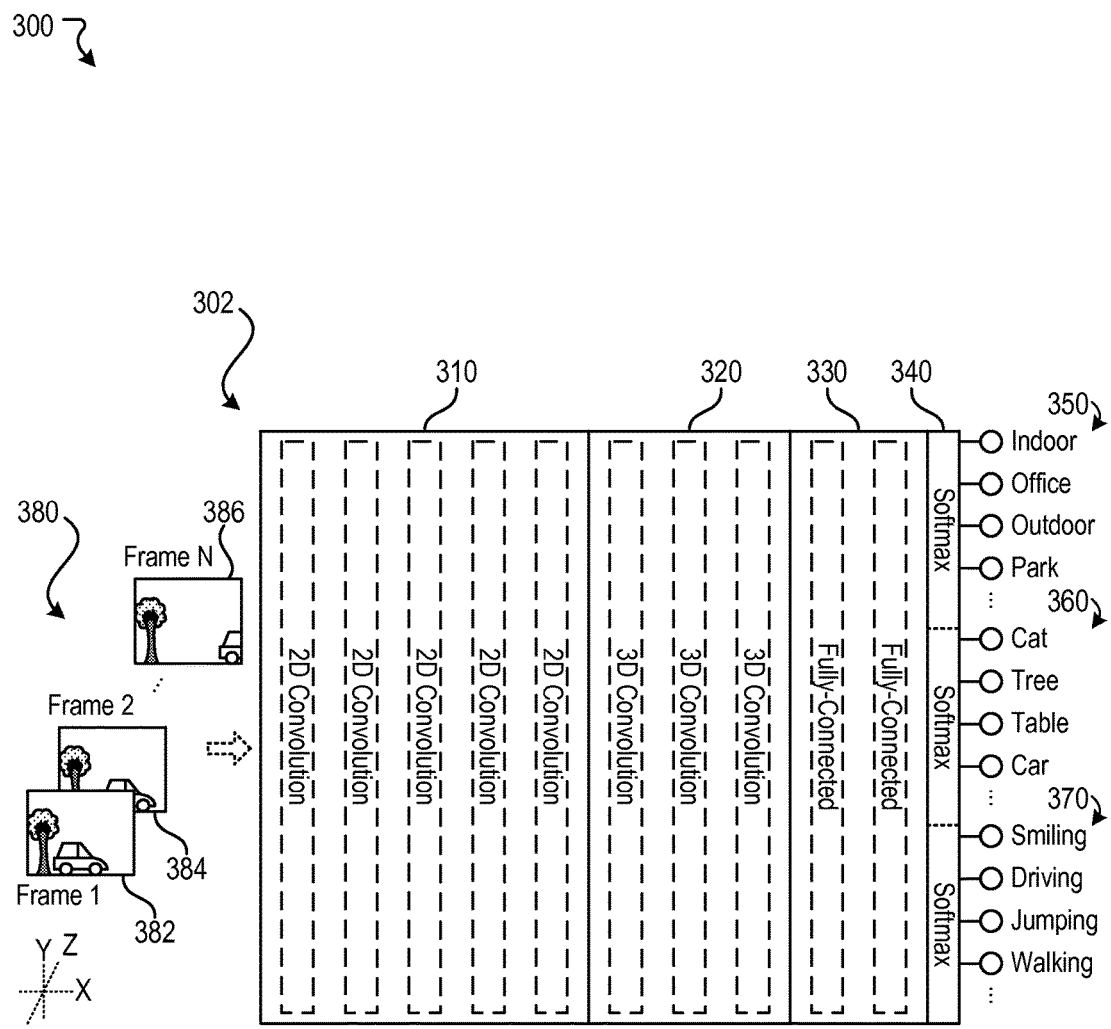
FIG. 3 illustrates an example scenario associated with determining video feature descriptors based on convolutional neural networks, according to an embodiment of the present disclosure.

FIG. 3 illustrates an example scenario 300 associated with determining video feature descriptors based on convolutional neural networks, according to an embodiment of the present disclosure. The example scenario 300 illustrates a (trained) convolutional neural network 302 configured to facilitate processing video content and determining video feature descriptors for the video content.

As shown in FIG. 3, the example convolutional neural network 302 can include a set of two-dimensional convolutional layers 310 and a set of three-dimensional convolutional layers 320. In the example scenario 300, the set of two-dimensional convolutional layers 310 can include at least five two-dimensional convolutional layers, and the set of three-dimensional convolutional layers 320 can include at least three three-dimensional convolutional layers. Moreover, in some implementations, the convolutional neural network 302 can include a set of fully-connected layers 330. Furthermore, in some embodiments, the convolutional neural network 302 can include a softmax layer 340. At least a portion of each layer can be connected with at least a portion of another layer and information can be transmitted through the layers.

In some cases, during a forward propagation through the convolutional neural network, data representing video content can be inputted through the first (e.g., leftmost in FIG. 3) two-dimensional convolutional layer and a plurality of video feature descriptors can be determined for the video content. The plurality of video feature descriptors can include one or more video feature descriptors for scenes 350, one or more video feature descriptors for objects 360, and one or more video feature descriptors for actions 370.

In the example scenario 300, a video 380 can be acquired. The video 380 can include, or be represented by, a set of images (i.e., video image frames, still frames, etc.). In this example, the video 380 can include Frame 1 382, Frame 2 384, and all other frames through Frame N 386. If the video 380 is recorded at 24 frames per second and if Frame N 386 is the 48th frame, for example, then a normal playback length of the video 380 should be two seconds. In some implementations, the convolutional neural network 302 can be configured to receive as input video content having 64 frames. It is contemplated that many variations are possible.

Moreover, the video 380 can be represented as a plurality of two-dimensional image frames. Each of the plurality of two-dimensional image frames can extend in a first spatial dimension (e.g., horizontal X-axis) and a second spatial dimension (e.g., vertical Y-axis). The plurality of two-dimensional image frames can be temporally sorted, such as from the first frame (e.g., Frame 1 382) to the last frame (e.g., Frame N 386). A third dimension (e.g., depth Z-axis) can correspond to a time dimension with respect to which the plurality of two-dimensional image frames is temporally sorted.

In one example, a representation of the video 380 can be inputted into the set of two-dimensional convolutional layers 310, such as via the first (or leftmost) two-dimensional convolutional layer. At least one two-dimensional convolutional operation can be applied, within the set of two-dimensional convolutional layers 310, to the representation of the video 380. The at least one two-dimensional convolutional operation can utilize at least one two-dimensional filter to convolve the representation of the video content. As such, the representation of the video content can be reduced in signal size based at least in part on the at least one two-dimensional convolutional operation. In some cases, the two-dimensional convolution module 204 of FIG. 2 can facilitate applying the at least one two-dimensional convolutional operation. Moreover, in this example, each two-dimensional convolutional layer can apply a respective two-dimensional convolutional operation to its received input signals and can generate output signals to be inputted into a next layer during forward propagation, where the convolutional operation causes the generated output signals to be reduced in size relative to the received input signals.

Continuing with the example, a first collection of signals can be outputted from the set of two-dimensional convolutional layers 310, such as via the last (or rightmost) two-dimensional convolutional layer. At least a portion of the first collection of signals can be inputted into the set of three-dimensional convolutional layers 320, such as via the first (or leftmost) three-dimensional convolutional layer. In this example, the first collection of signals can be outputted from the last (or rightmost) two-dimensional convolutional layer and at least the portion of the first collection of signals can be inputted into the first (or leftmost) three-dimensional convolutional layer.

Further, at least one three-dimensional convolutional operation can be applied, within the set of three-dimensional convolutional layers 320, to at least the portion of the first collection of signals. The at least one three-dimensional convolutional operation can utilize at least one three-dimensional filter to convolve at least the portion of the first collection of signals. In some cases, the three-dimensional convolution module 206 of FIG. 2 can facilitate applying the at least one three-dimensional convolutional operation. Moreover, in this example, each three-dimensional convolutional layer can apply a respective three-dimensional convolutional operation to its received input signals and can generate output signals to be inputted into a next layer during forward propagation.

Additionally, in this example, a second collection of signals can be outputted from the set of three-dimensional convolutional layers 320, such as via the last (or rightmost) three-dimensional convolutional layer. At least a portion of the second collection of signals can be inputted into the set of fully-connected layers 330, such as via the first (or leftmost) fully-connected layer. A third collection of signals can be outputted from the set of fully-connected layers 330, such as via the last (or rightmost) fully-connected layer. One or more outputs from the convolutional neural network 302 can be generated based at least in part on at least a portion of the third collection of signals. Accordingly, the one or more outputs from the convolutional neural network 302 can also be dependent on at least the portion of the second collection of signals since at least the portion of the third collection of signals can be dependent on at least the portion of the second collection of signals. In some cases, the one or more outputs can be normalized or otherwise suitably modified by the softmax layer 340.

Continuing with the previous example, based on the one or more outputs from the convolutional neural network 302, the plurality of video feature descriptors for the video 380 (e.g., scene descriptors 350, object descriptors 360, action descriptors 370, etc.) can be determined. In this example, the inputted video 380 can correspond to a recording of a car driving in a park. As such, the scene descriptors 350 can, for instance, indicate significant likelihoods that an outdoor scene and a park scene are recognized in the video 380 but lower likelihoods that an indoor scene and an office scene are recognized in the video 380. The object descriptors 360 can, for example, indicate significant likelihoods that a tree object and a car object are recognized but lower likelihoods for a cat object and a table object. Also, in this example, the action descriptors 370 can indicate a significant likelihood that a driving action is recognized in the video 380 but lower likelihoods for a smiling action, a jumping action, and a walking object. It should be noted that this example scenario 300 and its specific details are provided for illustrative purposes. Many variations are possible.

Figure 4:
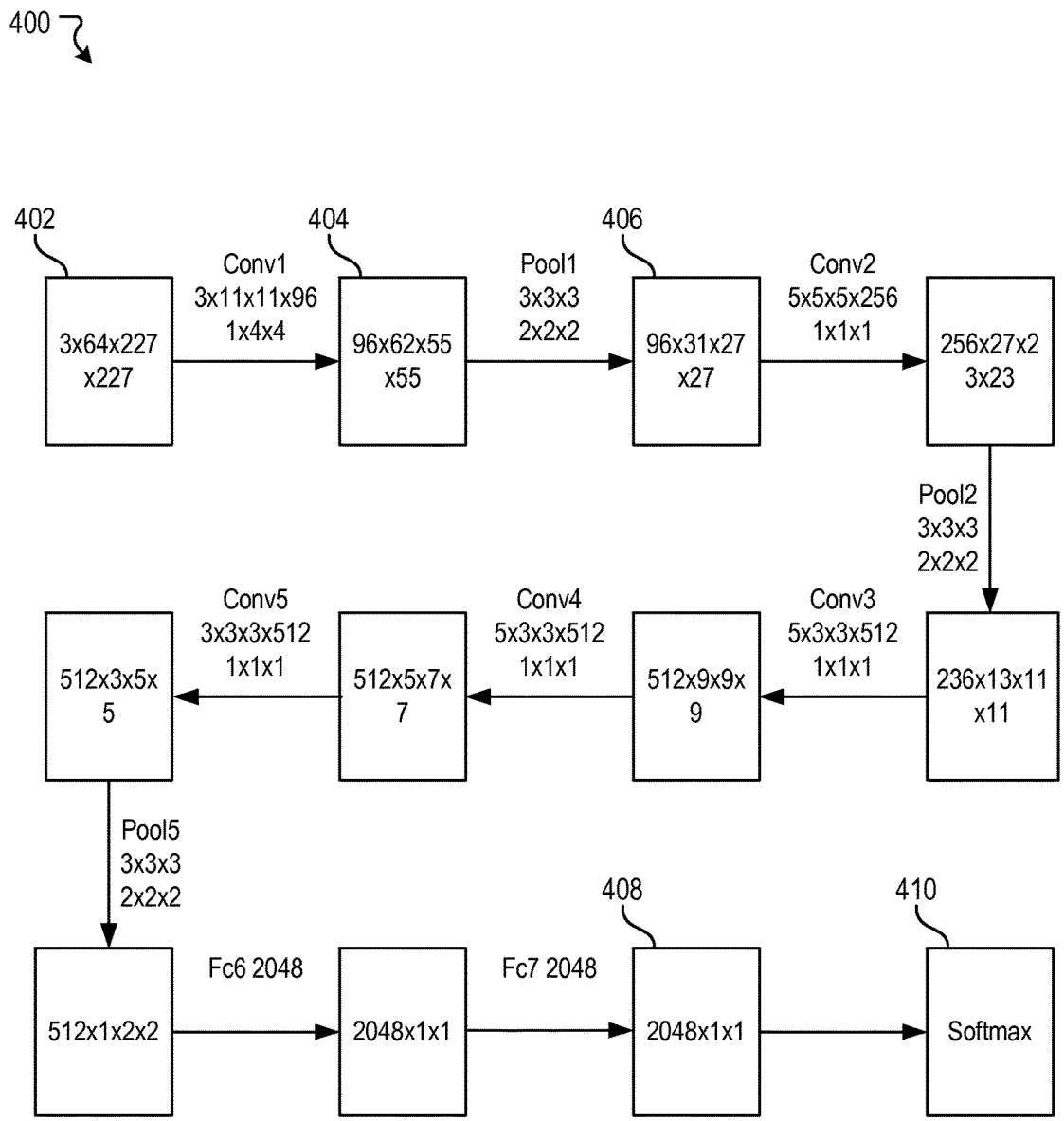
FIG. 4 illustrates an example flow associated with determining video feature descriptors based on convolutional neural networks, according to an embodiment of the present disclosure.

FIG. 4 illustrates an example flow 400 associated with determining video feature descriptors based on convolutional neural networks, according to an embodiment of the present disclosure. At block 402, the example flow 400 can take as input 64 frames of a video having a frame size of 227 pixels tall by 227 pixels wide with 3 color pixel values (e.g., RGB values). A first convolutional operation can be performed using a filter size of 11 pixels tall by 11 pixels wide and 3 frames in depth (i.e., the filter has 3 frames of 11 pixels by 11 pixels each). In this example, the first convolutional operation can utilize 96 filters and can employ a stride of 1×4×4 for each filter. At block 404, an output of the first convolutional operation can be determined. A first pooling operation with a filter size of 3×3×3 and a stride of 2×2×2 can be applied to the output of the first convolutional operation. At block 406, an output of the first pooling operation can be determined. In some cases, pooling operations can cause signals to be translational invariant. In some embodiments, max pooling operations can be utilized. Further, as shown in the example flow 400, additional convolutional operations and pooling operations can be subsequently performed to produce 2048 outputs, at block 408. At block 410, the outputs can be normalized, for example, by using a softmax process.

Moreover, in some embodiments, the quantities of filters, pooling operations, and/or convolutional operations can be specified or selected. In some implementations, frame sizes, filter sizes, pooling sizes, and stride values can be specified or selected. Furthermore, in some cases, the quantity of descriptors can be specified or selected as well. In one example, 4096 descriptors can be used. Again, it should be noted that this example and its specific details are provided for illustrative purposes. There can be many variations and other possibilities.

Figure 5:
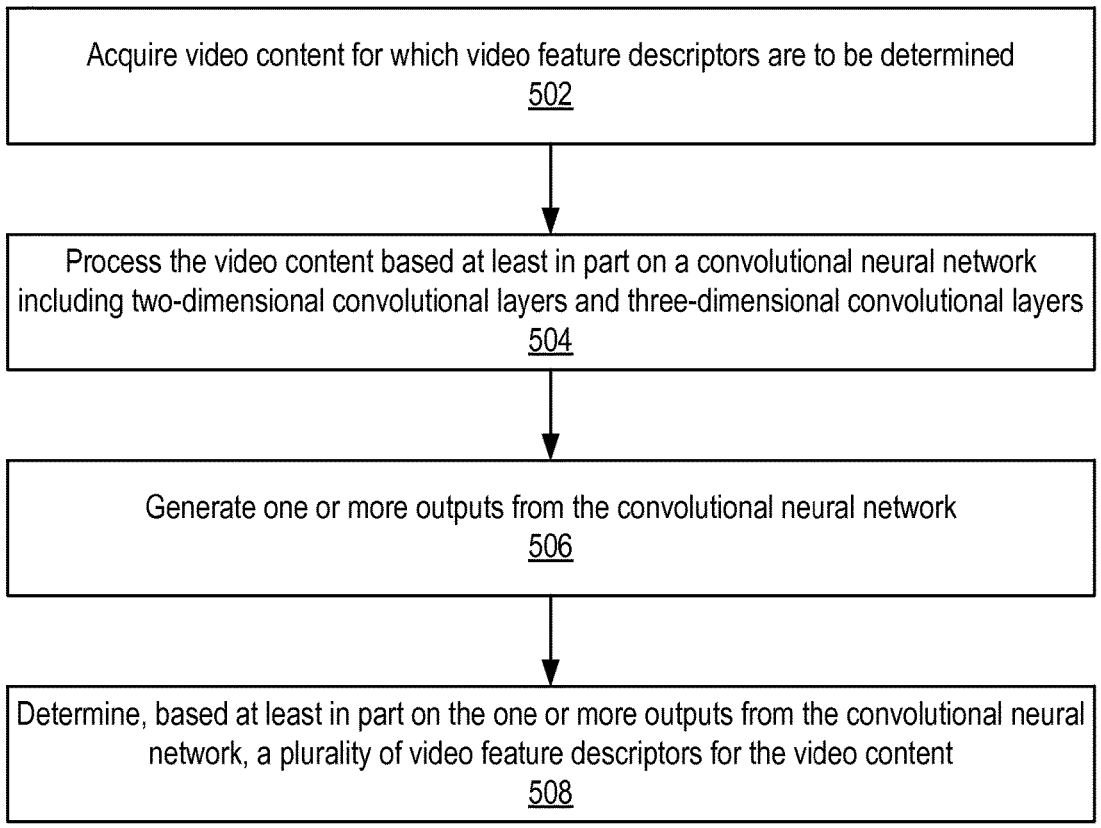
FIG. 5 illustrates an example method associated with determining video feature descriptors based on convolutional neural networks, according to an embodiment of the present disclosure.

FIG. 5 illustrates an example method 500 associated with determining video feature descriptors based on convolutional neural networks, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can acquire video content for which video feature descriptors are to be determined. At block 504, the example method 500 can process the video content based at least in part on a convolutional neural network including a set of two-dimensional convolutional layers and a set of three-dimensional convolutional layers. At block 506, the example method 500 can generate one or more outputs from the convolutional neural network. At block 508, the example method 500 can determine, based at least in part on the one or more outputs from the convolutional neural network, a plurality of video feature descriptors for the video content.

Figure 6:
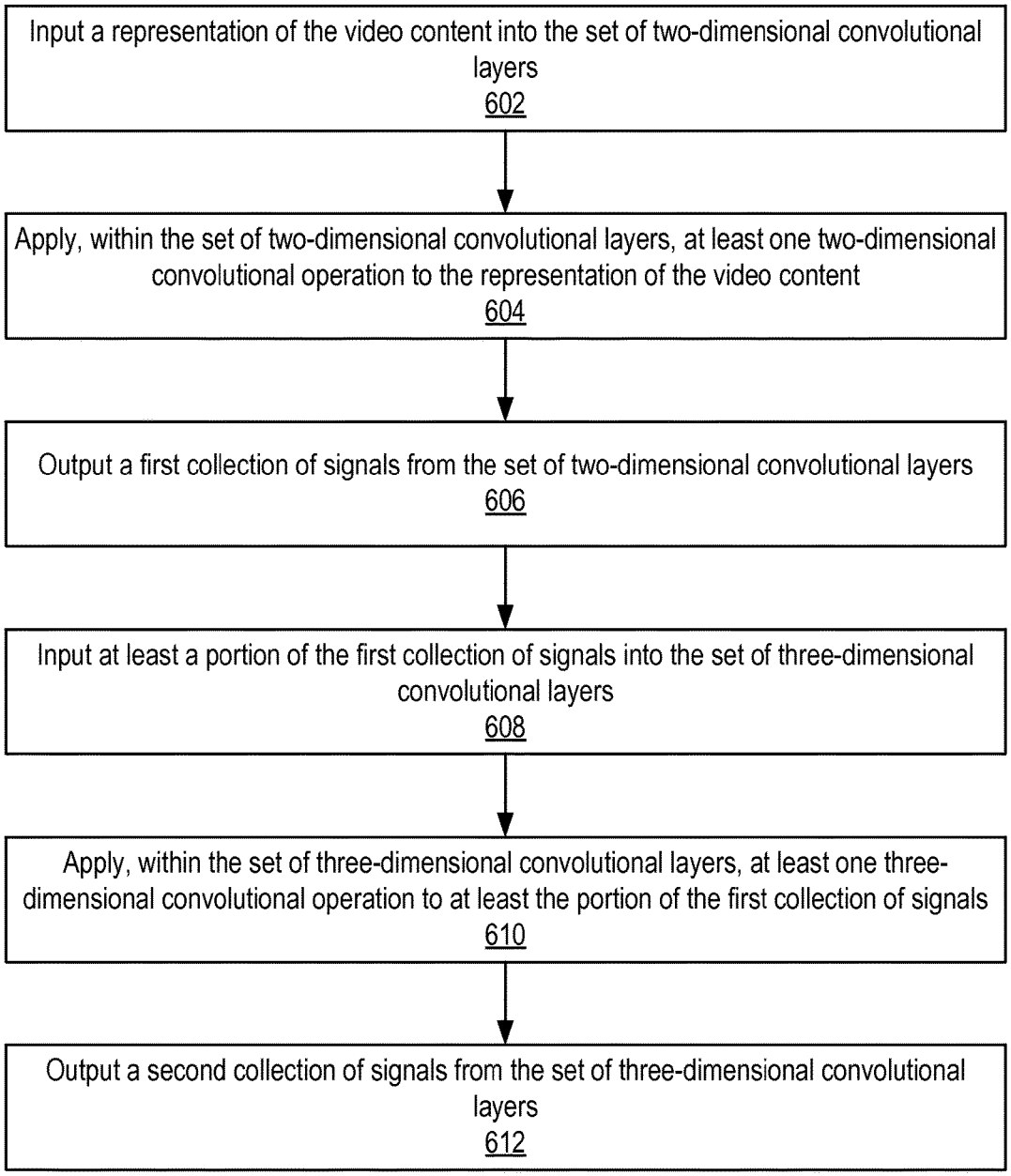
FIG. 6 illustrates an example method associated with determining video feature descriptors based on convolutional neural networks, according to an embodiment of the present disclosure.

FIG. 6 illustrates an example method 600 associated with determining video feature descriptors based on convolutional neural networks, according to an embodiment of the present disclosure. Again, it should be understood that there can be additional, fewer, or alternative steps performed in similar or alternative orders, or in parallel, within the scope of the various embodiments unless otherwise stated.

The example method 600 can facilitate the processing of the video content based at least in part on the convolutional neural network. At block 602, the example method 600 can input a representation of the video content into the set of two-dimensional convolutional layers. At block 604, the example method 600 can apply, within the set of two-dimensional convolutional layers, at least one two-dimensional convolutional operation to the representation of the video content. At block 606, the example method 600 can output a first collection of signals from the set of two-dimensional convolutional layers. At block 608, the example method 600 can input at least a portion of the first collection of signals into the set of three-dimensional convolutional layers. At block 610, the example method 600 can apply, within the set of three-dimensional convolutional layers, at least one three-dimensional convolutional operation to at least the portion of the first collection of signals. At block 612, the example method 600 can output a second collection of signals from the set of three-dimensional convolutional layers. The one or more outputs from the convolutional neural network can be dependent on at least a portion of the second collection of signals.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
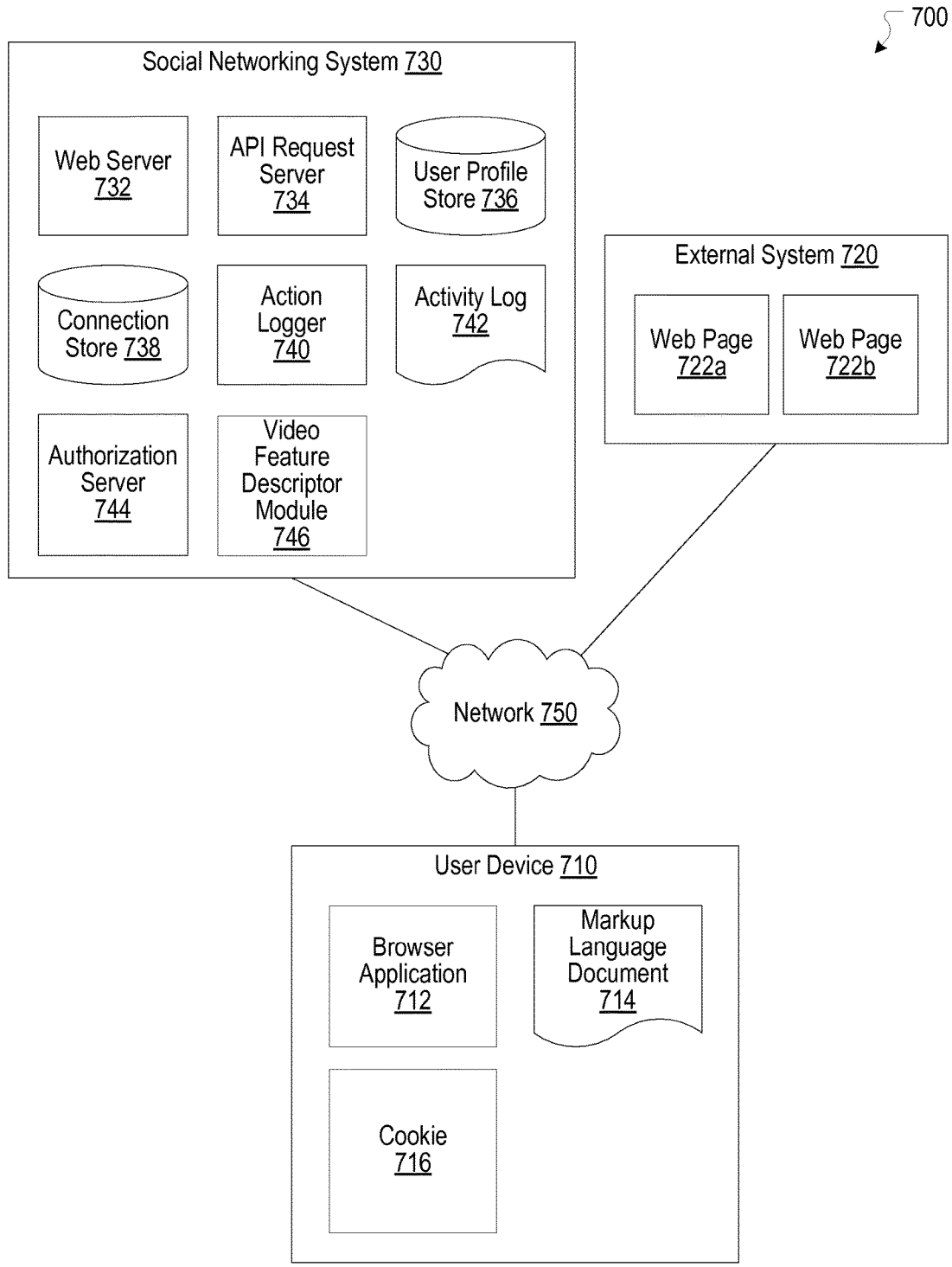
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a video feature descriptor module 746. The video feature descriptor module 746 can, for example, be implemented as the video feature descriptor module 102 of FIG. 1. As discussed previously, it should be appreciated that there can be many variations and other possibilities. Other features of the video feature descriptor module 746 are discussed herein in connection with the video feature descriptor module 102.

Hardware Implementation

Figure 8:
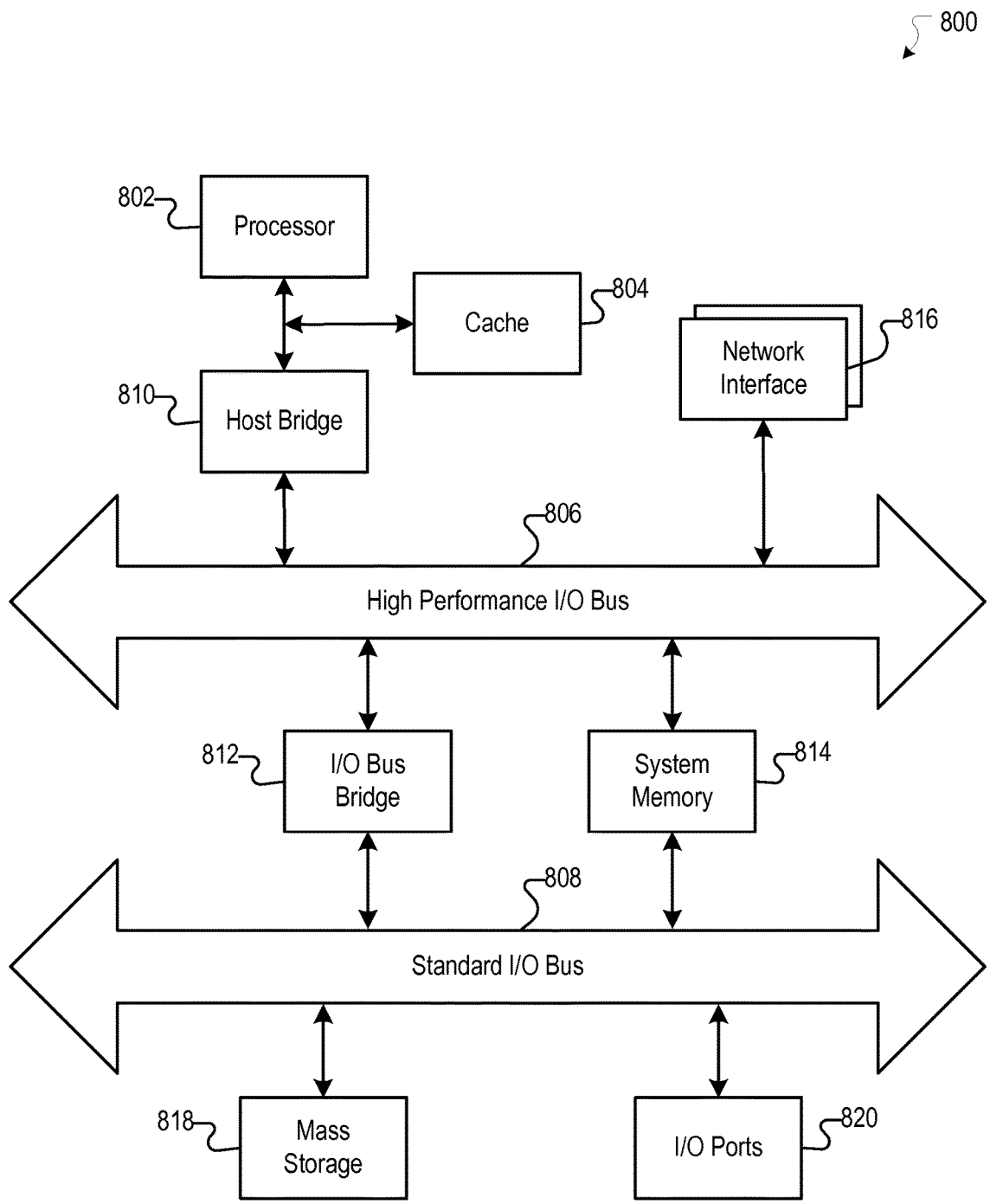
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    acquiring, by a computing system, video content for which video feature descriptors are to be determined, wherein the video content is represented as a plurality of two-dimensional image frames, wherein each of the plurality of two-dimensional image frames extends in a first spatial dimension and a second spatial dimension, wherein the plurality of two-dimensional image frames are temporally sorted, and wherein a third dimension corresponds to a time dimension with respect to which the plurality of two-dimensional image frames are temporally sorted;
    processing, by the computing system, the video content based at least in part on a convolutional neural network including a set of two-dimensional convolutional layers and a set of three-dimensional convolutional layers, wherein at least a portion of signals outputted by the set of two-dimensional convolutional layers are inputted into the set of three-dimensional convolutional layers, and wherein the set of three-dimensional convolutional layers generate one or more outputs based on the signals outputted by the set of two-dimensional convolutional layers; and
    determining, by the computing system, based at least in part on the one or more outputs from the set of three-dimensional convolutional layers in the convolutional neural network, a plurality of video feature descriptors for the video content.

2. The computer-implemented method of claim 1, wherein the processing of the video content based at least in part on the convolutional neural network further comprises:
    inputting a representation of the video content into the set of two-dimensional convolutional layers;
    applying, within the set of two-dimensional convolutional layers, at least one two-dimensional convolutional operation to the representation of the video content;
    outputting a first collection of signals from the set of two-dimensional convolutional layers;
    inputting at least a portion of the first collection of signals into the set of three-dimensional convolutional layers;
    applying, within the set of three-dimensional convolutional layers, at least one three-dimensional convolutional operation to at least the portion of the first collection of signals; and
    outputting a second collection of signals from the set of three-dimensional convolutional layers, wherein the one or more outputs from the convolutional neural network are dependent on at least a portion of the second collection of signals.

3. The computer-implemented method of claim 2, wherein the convolutional neural network includes a set of fully-connected layers, wherein at least the portion of the second collection of signals is inputted into the set of fully-connected layers, wherein the set of fully-connected layers outputs a third collection of signals, and wherein the one or more outputs from the convolutional neural network are generated based at least in part on at least a portion of the third collection of signals.

4. The computer-implemented method of claim 2, wherein the at least one two-dimensional convolutional operation utilizes at least one two-dimensional filter to convolve the representation of the video content, and wherein the representation of the video content is reduced in signal size based at least in part on the at least one two-dimensional convolutional operation.

5. The computer-implemented method of claim 2, wherein the at least one three-dimensional convolutional operation utilizes at least one three-dimensional filter to convolve at least the portion of the first collection of signals.

6. The computer-implemented method of claim 1, wherein the set of two-dimensional convolutional layers includes at least five two-dimensional convolutional layers, and wherein the set of three-dimensional convolutional layers includes at least three three-dimensional convolutional layers.

7. The computer-implemented method of claim 1, further comprising:
    training the convolutional neural network based at least in part on the video content, wherein the video content is associated with one or more labels for at least one of a recognized scene, a recognized object, or a recognized action.

8. The computer-implemented method of claim 7, wherein the training of the convolutional neural network further comprises:
    determining one or more differences between the one or more labels and the plurality of video feature descriptors; and
    adjusting one or more weight values of one or more filters associated with the convolutional neural network to minimize the one or more differences, wherein the adjusting of the one or more weight values occurs during a backpropagation through the convolutional neural network.

9. The computer-implemented method of claim 1, wherein the video feature descriptors provide a first set of metrics indicating likelihoods that specified scenes are represented in the video content, a second set of metrics indicating likelihoods that specified objects are represented in the video content, and a third set of metrics indicating likelihoods that specified actions are represented in the video content.

10. A system comprising:
    at least one processor; and
    a memory storing instructions that, when executed by the at least one processor, cause the system to perform:
    acquiring video content for which video feature descriptors are to be determined, wherein the video content is represented as a plurality of two-dimensional image frames, wherein each of the plurality of two-dimensional image frames extends in a first spatial dimension and a second spatial dimension, wherein the plurality of two-dimensional image frames are temporally sorted, and wherein a third dimension corresponds to a time dimension with respect to which the plurality of two-dimensional image frames are temporally sorted;
    processing the video content based at least in part on a convolutional neural network including a set of two-dimensional convolutional layers and a set of three-dimensional convolutional layers, wherein at least a portion of signals outputted by the set of two-dimensional convolutional layers are inputted into the set of three-dimensional convolutional layers, and wherein the set of three-dimensional convolutional layers generate one or more outputs based on the signals outputted by the set of two-dimensional convolutional layers; and determining based at least in part on the one or more outputs from the set of three-dimensional convolutional layers in the convolutional neural network, a plurality of video feature descriptors for the video content.

11. The system of claim 10, wherein the video content is represented as a plurality of two-dimensional image frames, wherein each of the plurality of two-dimensional image frames extends in a first spatial dimension and a second spatial dimension, wherein the plurality of two-dimensional image frames is temporally sorted, and wherein a third dimension corresponds to a time dimension with respect to which the plurality of two-dimensional image frames is temporally sorted.

12. The system of claim 10, wherein the processing of the video content based at least in part on the convolutional neural network further comprises:
inputting a representation of the video content into the set of two-dimensional convolutional layers;
applying, within the set of two-dimensional convolutional layers, at least one two-dimensional convolutional operation to the representation of the video content;
outputting a first collection of signals from the set of two-dimensional convolutional layers;
inputting at least a portion of the first collection of signals into the set of three-dimensional convolutional layers;
applying, within the set of three-dimensional convolutional layers, at least one three-dimensional convolutional operation to at least the portion of the first collection of signals; and
outputting a second collection of signals from the set of three-dimensional convolutional layers, wherein the one or more outputs from the convolutional neural network are dependent on at least a portion of the second collection of signals.

13. The system of claim 10, wherein the set of two-dimensional convolutional layers includes at least five two-dimensional convolutional layers, and wherein the set of three-dimensional convolutional layers includes at least three three-dimensional convolutional layers.

14. The system of claim 10, wherein the video feature descriptors provide a first set of metrics indicating likelihoods that specified scenes are represented in the video content, a second set of metrics indicating likelihoods that specified objects are represented in the video content, and a third set of metrics indicating likelihoods that specified actions are represented in the video content.

15. A non-transitory computer-readable storage medium including instructions that, when executed by at least one processor of a computing system, cause the computing system to perform:
acquiring video content for which video feature descriptors are to be determined, wherein the video content is represented as a plurality of two-dimensional image frames, wherein each of the plurality of two-dimensional image frames extends in a first spatial dimension and a second spatial dimension, wherein the plurality of two-dimensional image frames are temporally sorted, and wherein a third dimension corresponds to a time dimension with respect to which the plurality of two-dimensional image frames are temporally sorted;
processing the video content based at least in part on a convolutional neural network including a set of two-dimensional convolutional layers and a set of three-dimensional convolutional layers, wherein at least a portion of signals outputted by the set of two-dimensional convolutional layers are inputted into the set of three-dimensional convolutional layers, and wherein the set of three-dimensional convolutional layers generate one or more outputs based on the signals outputted by the set of two-dimensional convolutional layers; and determining based at least in part on the one or more outputs from the set of three-dimensional convolutional layers in the convolutional neural network, a plurality of video feature descriptors for the video content.

16. The non-transitory computer-readable storage medium of claim 15, wherein the video content is represented as a plurality of two-dimensional image frames, wherein each of the plurality of two-dimensional image frames extends in a first spatial dimension and a second spatial dimension, wherein the plurality of two-dimensional image frames is temporally sorted, and wherein a third dimension corresponds to a time dimension with respect to which the plurality of two-dimensional image frames is temporally sorted.

17. The non-transitory computer-readable storage medium of claim 15, wherein the processing of the video content based at least in part on the convolutional neural network further comprises:
inputting a representation of the video content into the set of two-dimensional convolutional layers;
applying, within the set of two-dimensional convolutional layers, at least one two-dimensional convolutional operation to the representation of the video content;
outputting a first collection of signals from the set of two-dimensional convolutional layers;
inputting at least a portion of the first collection of signals into the set of three-dimensional convolutional layers;
applying, within the set of three-dimensional convolutional layers, at least one three-dimensional convolutional operation to at least the portion of the first collection of signals; and
outputting a second collection of signals from the set of three-dimensional convolutional layers, wherein the one or more outputs from the convolutional neural network are dependent on at least a portion of the second collection of signals.

18. The non-transitory computer-readable storage medium of claim 15, wherein the set of two-dimensional convolutional layers includes at least five two-dimensional convolutional layers, and wherein the set of three-dimensional convolutional layers includes at least three three-dimensional convolutional layers.

19. The non-transitory computer-readable storage medium of claim 15, wherein the video feature descriptors provide a first set of metrics indicating likelihoods that specified scenes are represented in the video content, a second set of metrics indicating likelihoods that specified objects are represented in the video content, and a third set of metrics indicating likelihoods that specified actions are represented in the video content.

* * * * *